(12) United States Patent
Lee et al.

(10) Patent No.: US 12,019,054 B2
(45) Date of Patent: Jun. 25, 2024

(54) DEVICE FOR EVALUATING 360-DEGREE BIDIRECTIONAL FOLDING DURABILITY OF FLEXIBLE MATERIAL

(71) Applicant: FlexiGO INC., Cheonan-si (KR)

(72) Inventors: Ki Yong Lee, Cheonan-si (KR); Hyeon Bong Moon, Cheonan-si (KR); Ho Moon You, Cheongju-si (KR); Chang Shin Kwak, Cheongju-si (KR)

(73) Assignee: FlexiGO INC., Cheonan-si (KR)

( * ) Notice: Subject to any disclaimer, the term of this patent is extended or adjusted under 35 U.S.C. 154(b) by 343 days.

(21) Appl. No.: 17/510,810

(22) Filed: Oct. 26, 2021

(65) Prior Publication Data
US 2022/0042891 A1 Feb. 10, 2022

Related U.S. Application Data

(63) Continuation of application No. PCT/KR2020/003053, filed on Mar. 4, 2020.

(30) Foreign Application Priority Data

May 13, 2019 (KR) .................. 10-2019-0055898
Sep. 11, 2019 (KR) .................. 10-2019-0112834

(51) Int. Cl.
*G01N 3/20* (2006.01)
*G01N 3/02* (2006.01)

(52) U.S. Cl.
CPC ............. *G01N 3/20* (2013.01); *G01N 3/02* (2013.01); *G01N 2203/0023* (2013.01); *G01N 2203/0254* (2013.01); *G01N 2203/0282* (2013.01)

(58) Field of Classification Search
CPC ............. G01N 3/20; G01N 2203/0023
See application file for complete search history.

(56) References Cited

FOREIGN PATENT DOCUMENTS

| KR | 10-1349789 B1 | 1/2014 |
|---|---|---|
| KR | 10-1489667 B1 | 2/2015 |
| KR | 10-2016-0087143 A | 7/2016 |
| KR | 10-2018-0000130 A | 1/2018 |
| KR | 10-1843874 B1 | 3/2018 |
| KR | 10-2019-0005302 A | 1/2019 |
| WO | 2019/041546 A1 | 3/2019 |

OTHER PUBLICATIONS

Lee et al., Folding Device for Flexible Material Durability Evaluation, Mar. 2018, FIT Computer Translation (Year: 2018).*

* cited by examiner

*Primary Examiner* — Erika J. Villaluna
(74) *Attorney, Agent, or Firm* — United One Law Group LLC; Kongsik Kim; Jhongwoo Peck (57) ABSTRACT

Provided is a device for evaluating 360-degree bidirectional folding durability of a flexible material in which during a folding test of a film-type flexible material, a single folding device can implement both the infolding and outfolding of the flexible material relative to the unfolded state of the flexible material. To this end, the device includes: a fixing unit configured to fix a first side of the flexible material to be evaluated; a moving unit configured to fix a second side of the flexible material and disposed to be spaced apart from the fixing unit; a motion guide unit to which the fixing unit is fixed; and a motion unit connecting the motion guide unit with the moving unit.

14 Claims, 9 Drawing Sheets

DEVICE FOR EVALUATING 360-DEGREE BIDIRECTIONAL FOLDING DURABILITY OF FLEXIBLE MATERIAL

CROSS-REFERENCE TO RELATED APPLICATIONS

This application is a Continuation of International Application No. PCT/KR2020/003053 filed on Mar. 4, 2020, which claims priority to Korean Application Nos. 10-2019-0112834 and 10-2019-0055898 filed on Sep. 11, 2019 and May 13, 2019, respectively. The aforementioned applications are incorporated herein by reference in their entireties.

TECHNICAL FIELD

The present disclosure relates generally to a device for evaluating 360-degree bidirectional folding durability of a flexible material. More particularly, the present disclosure relates to a device for evaluating 360-degree bidirectional folding durability of a flexible material in which during a folding test of a film-type flexible material, a single folding device can implement both the infolding and outfolding of the flexible material relative to the unfolded state of the flexible material.

RELATED ART

Generally, a conventional display panel used for a display of a television, a computer monitor, or for various portable electronic devices uses an inflexible glass substrate and has a flat structure, and thus is monotonous and is limited in application.

For this reason, instead of the inflexible glass substrate, due to the development of science and technology, recently, flexible display devices which are made of a flexible material such as plastic and are bendable have been developed and produced. For example, the technology of manufacturing a flexible display panel that can be folded or rolled up like a scroll has also been developed.

For example, US Patent Application Publication No. 2014/0247544 (Roll-type flexible device for displaying) discloses a technology in which a flexible display portion is wound on a roll located inside a housing by using a rod assembly connecting a plurality of rods to each other having rotatable X shapes.

Display elements used in the various types of flexible display devices described above include TFT LCD, an organic EL element, and an electrophoresis element, and the durability of materials applied thereto (hereinafter, referred to as a flexible material) is directly related to the lifespan of a product, so the durability test of a material selected prior to design of the product is essentially performed.

The durability test includes various types of durability test, and a folding test is also included therein. The folding test is a test that repeats bending and unfolding of a flexible material. For example, a device that mechanically rotates a rotating plate with a portion of a specimen of a flexible material fixed to a fixing plate and the remaining portion thereof fixed to the rotating plate was used.

However, an accurate folding test could not be performed with this type of folding device. This is because during the rotation of a rotating plate, a tensile force cannot be prevented from being applied to the flexible material. Inability to implement only a bending motion of the flexible material causes a significant decrease in the reliability of the folding test.

In the prior art, there are Korean Patent No. 10-1349789 (Testing device for a film bending), and Korean Patent Application Publication No. 10-2016-0087143 (Apparatus for durability test of the folding of solar cell module).

SUMMARY

In order to solve the above problems occurring in the prior art, the present disclosure is intended to propose a device for evaluating 360-degree bidirectional folding durability of a flexible material in which during a folding test of a film-type flexible material, a single folding device can implement both the infolding and outfolding of the flexible material relative to the unfolded state of the flexible material.

In order to accomplish the above objectives, according to an exemplary embodiment, a device for evaluating 360-degree bidirectional folding durability of a flexible material according to the present disclosure includes: a fixing unit configured to fix a first side of the flexible material to be evaluated; a moving unit configured to fix a second side of the flexible material and disposed to be spaced apart from the fixing unit such that the moving unit has the same plane as a plane of the fixing unit in an unfolded state of the flexible material, the moving unit being configured to rotate relative to the fixing unit so as to infold or outfold the flexible material in the unfolded state; a motion guide unit to which the fixing unit is fixed, the motion guide unit forming a rotation path of the moving unit such that the moving unit rotates relative to a middle point between the fixing unit and the moving unit; and a motion unit connecting the motion guide unit with the moving unit, wherein the moving unit makes a pivot rotation relative to the motion unit in response to each of the infolding and outfolding of the flexible material, and slides along a normal direction passing through the middle point between the fixing unit and the moving unit.

Here, a circular guide groove part may be formed in the motion guide unit by being recessed therefrom by corresponding to the rotation path of the moving unit, the motion unit may include: a rotating shaft located at the middle point and provided rotatably at the motion guide unit; a motion block fixed to the rotating shaft; a sliding block coupled to the motion block such that the sliding block slides along a longitudinal direction of the motion block; and a guide block coupled rotatably to the sliding block and having a guide protrusion part formed at the guide block by protruding therefrom, the guide protrusion part being fitted and coupled to the guide groove part such that the guide protrusion part moves along the guide groove part in response to the rotation of the moving unit, and the moving unit may be fixed to the guide block.

Here, the guide groove part may be provided with an infolding stopper indicating an infolding completion position of the flexible material, and an outfolding stopper indicating an outfolding completion position of the flexible material.

Here, the guide groove part may include: an arc-shaped first infolding groove constituting a movement path of the guide protrusion part according to the infolding among movement paths of the moving unit; an arc-shaped second infolding groove formed at an outer side of the first infolding groove to be parallel thereto and constituting a movement path of the guide protrusion part according to the infolding among the movement paths of the moving unit; an arc-shaped first outfolding groove communicating with the first infolding groove and constituting a movement path of the guide protrusion part according to the outfolding among the movement paths of the moving unit; and an arc-shaped second outfolding groove communicating with the second infolding groove and formed at an outer side of the first outfolding groove to be parallel thereto, the second outfolding groove constituting a movement path of the guide protrusion part according to the outfolding among the movement paths of the moving unit.

Here, the guide protrusion part may include a first protrusion part moving in the first infolding groove and the first outfolding groove, and a second protrusion part moving in the second infolding groove and the second outfolding groove, wherein any one of the first protrusion part and the second protrusion part may belong to any one of virtual straight lines passing through the middle point, and a remaining one of the first protrusion part and the second protrusion part may belong to a remaining one of the virtual straight lines passing through the middle point.

The device for evaluating 360-degree bidirectional folding durability of a flexible material according to the present disclosure may further include: at least any one of a motion drive unit configured to rotate the motion unit relative to the motion guide unit, and a rotation limiting unit located at the middle point and configured to select whether to rotate the moving unit relative to the motion guide unit.

According to the device for evaluating 360-degree bidirectional folding durability of a flexible material of the present disclosure, when a curvature radius of an infolded bent part formed on the flexible material in an infolded state thereof is R0, and when a curvature radius of an outfolded bent part formed on the flexible material in an outfolded state thereof is R1, R1 may indicate a curvature radius larger than R0, and a distance between the fixing unit and the moving unit may be expressed as $\pi R1$.

According to the device for evaluating 360-degree bidirectional folding durability of a flexible material of the present disclosure, during a folding test of a film-type flexible material, a single folding device can implement both the infolding and outfolding of the flexible material relative to the unfolded state of the flexible material. In other words, during the folding test of a film-type flexible material, the single folding device repeatedly folds the flexible material by 180 degrees toward a side of each of the opposite surfaces of the flexible material relative to the flexible material, whereby the flexible material can be repeatedly folded in opposite directions such that the curvature radius of the infolded bent part according to the infolding of the flexible material and the curvature radius of the outfolded bent part according to the outfolding of the flexible material are different from each other.

In addition, according to the present disclosure, due to the coupling relationship of the motion guide unit and a motion unit to each other, the unnecessary movement of the moving unit can be prevented in the process of the rotation of the moving unit.

Furthermore, according to the present disclosure, due to the detailed configuration of the motion unit, the rotation of the moving unit is efficiently performed, and when the infolding and outfolding of the flexible material is performed during the folding test of the flexible material, forces including a tensile force are not applied to the flexible material, thereby securing the high reliability of the test and enabling a corresponding accurate durability evaluation.

Additionally, according to the present disclosure, when performing the infolding and outfolding of the flexible material during the folding test of the flexible material, due to the configuration of a stopper, the guide protrusion part can be stopped in the guide groove part, and the folding completion state of the flexible material can be secured.

In addition, according to the present disclosure, due to the detailed configuration of the guide groove part, the rotation path of the moving unit is defined, thereby stabilizing the parallel state of the fixing unit and the moving unit to each other in the folding completion position.

Furthermore, according to the present disclosure, due to the detailed configuration of the guide protrusion part, the movement of the motion unit can be stabilized during the rotation of the moving unit.

Additionally, according to the present disclosure, due to the configuration of the motion drive unit, the folding test can be automated.

In addition, according to the present disclosure, due to the configuration of the rotation limiting unit, whether to rotate the moving unit can be selected.

Furthermore, according to the present disclosure, due to numerical limitation of each element of the single folding device, the infolding and outfolding of the single folding device can be prevented from interfering with each other and the flexible material can be safely protected.

DETAILED DESCRIPTION

Hereinbelow, an embodiment of a device for evaluating 360-degree bidirectional folding durability of a flexible material according to the present disclosure will be described with reference to the accompanying drawings. In this case, the present disclosure is not limited to the embodiment. In addition, in describing the present disclosure, detailed descriptions of well-known functions or configurations may be omitted in order to clarify the gist of the present invention.

Referring to FIGS. 1 to 6, the device for evaluating 360-degree bidirectional folding durability of a flexible material according to the embodiment of the present disclosure includes a fixing unit 10, a moving unit 20, a motion guide unit 30, and a motion unit 40, and may further include at least any one of a motion drive unit 50 and a rotation limiting unit 60.

The fixing unit 10 fixes a first side of the flexible material F to be evaluated.

The fixing unit 10 is fixed to the motion guide unit 30 via a fixing bracket 11.

The moving unit 20 fixes a second side of the flexible material F. The moving unit 20 is disposed by being spaced apart from the fixing unit 10 such that the moving unit 20 has the same plane as a plane of the fixing unit 10 in the unfolded state of the flexible material. The moving unit 20 rotates relative to the fixing unit 10 and may infold or outfold the flexible material F of the unfolded state.

More specifically, the moving unit 20 can make a pivot rotation relative to the motion unit 40 in response to each of the infolding and outfolding of the flexible material F, and can slide along a normal direction passing through the middle point between the fixing unit 10 and the moving unit 20. Accordingly, when the moving unit infolds or outfolds the flexible material F in the unfolded state, forces including a tensile force are not applied to the flexible material F.

Figure 6:
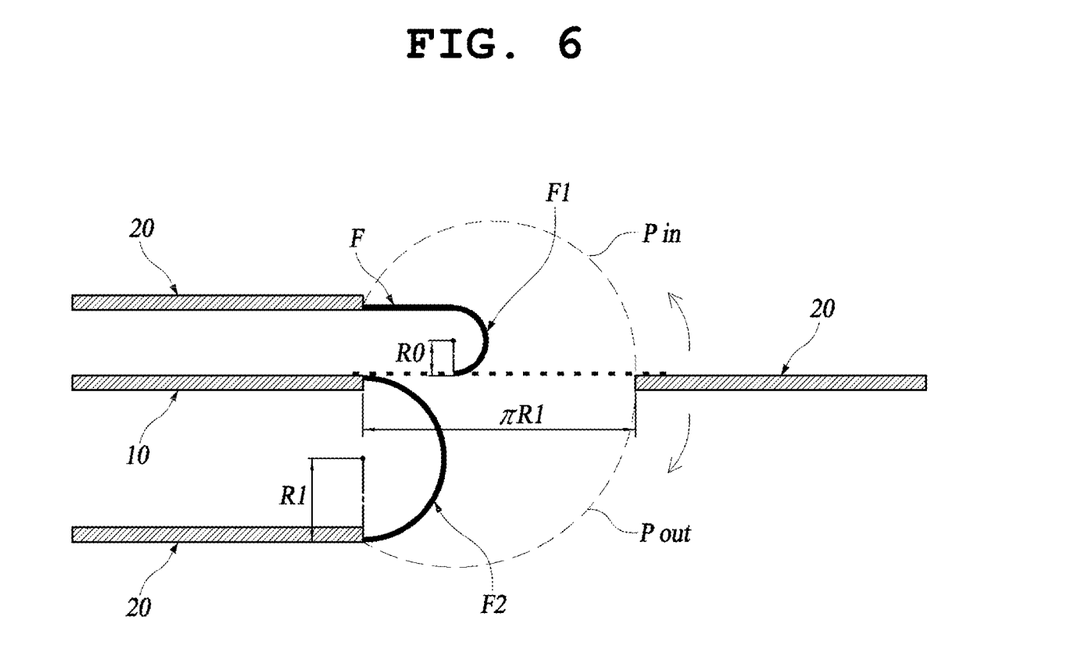
FIG. 6 is a thematic view of the infolding and outfolding of the device for evaluating 360-degree bidirectional folding durability of a flexible material according to the embodiment of the present disclosure.

As illustrated in FIG. 6, when the curvature radius of an infolded bent part F1 formed on the flexible material F in an infolded state thereof is R0 and when the curvature radius of an outfolded bent part F2 formed on the flexible material F in an outfolded state thereof is R1, R1 is a curvature radius larger than R0, and a distance between the fixing unit 10 and the moving unit 20 may be expressed as πR1. In the embodiment of the present disclosure, R1 may be 2 to 3 times or more larger than R0.

Accordingly, in the embodiment of the present disclosure, when a single folding device infolds or outfolds the flexible material F of the unfolded state, the single folding device can smoothly bend the flexible material F in a state in which the infolding and the outfolding do not interfere with each other.

The moving unit 20 is fixed to the motion unit 40 via a moving bracket 21.

The fixing unit 10 is fixed to the motion guide unit 30. The rotation path of the moving unit 20 is formed in the motion guide unit 30 such that the moving unit 20 can rotate relative to the middle point between the fixing unit 10 and the moving unit 20.

More specifically, a circular guide groove part is formed in the motion guide unit 30 by being recessed therefrom by corresponding to the rotation path of the moving unit 20. The center of the circular guide groove part may be selected as a middle point between the fixing unit 10 and the moving unit 20.

The guide groove part may be configured as a double structure.

More specifically, the guide groove part may include: an arc-shaped first infolding groove 31 formed in the motion unit 40 and constituting a movement path of a guide protrusion part (a first protrusion part 443) according to the infolding among movement paths of the moving unit 20; an arc-shaped second infolding groove 32 located at the outer side of the first infolding groove 31 to be parallel thereto and formed in the motion unit 40, the second infolding groove constituting a movement path of a guide protrusion part (a second protrusion part 444) according to the infolding among the movement paths of the moving unit 20; an arc-shaped first outfolding groove 33 communicating with the first infolding groove 31 and formed in the motion unit 40, the first outfolding groove constituting a movement path of the guide protrusion part (the first protrusion part 443) according to the outfolding among the movement paths of the moving unit 20; and an arc-shaped second outfolding groove 34 communicating with the second infolding groove 32 and formed at the outer side of the first outfolding groove 33 to be parallel thereto, the second outfolding groove 34 being formed in the motion unit 40 and constituting a movement path of the guide protrusion part (the second protrusion part 444) according to the outfolding among the movement paths of the moving unit 20.

In this case, the first infolding groove 31 and the first outfolding groove 33 may have a circular shape centered on a central point therebetween, and the second infolding groove 32 and the second outfolding groove 34 may have a circular shape centered on a central point therebetween.

Here, the guide groove part is provided with an infolding stopper 301 indicating an infolding completion position of the flexible material, and an outfolding stopper 302 indicating the outfolding completion position of the flexible material. Accordingly, the moving unit 20 can be prevented from being further rotated in each of the infolding completion state of the flexible material F and the outfolding completion state of the flexible material F.

In other words, the infolding stopper 301 is formed at each of the free end portion of the first infolding groove 31 and the free end portion of the second infolding groove 32, and the outfolding stopper 302 is formed at each of the free end portion of the first outfolding groove 33 and the free end portion of the second outfolding groove 34.

In this case, as for the position of the infolding stopper 301 relative to the fixing unit 10 when seen from a side, the infolding stopper 301 formed at the free end portion of the second infolding groove 32 is disposed at a side lower than the infolding stopper 301 formed at the free end portion of the first infolding groove 31 such that in the infolding completion state of the flexible material F, the fixing unit 10 and the moving unit 20 are substantially parallel to each other.

In addition, as for the position of the outfolding stopper 302 relative to the fixing unit when seen from a side, the outfolding stopper 302 formed at the free end portion of the second outfolding groove 34 is disposed at a side lower than the outfolding stopper 302 formed at the free end portion of the first outfolding groove 33 such that in the outfolding completion state of the flexible material F, the fixing unit 10 and the moving unit 20 are substantially parallel to each other.

The motion unit 40 connects the motion guide unit 30 and the moving unit 20 to each other.

Figure 1:
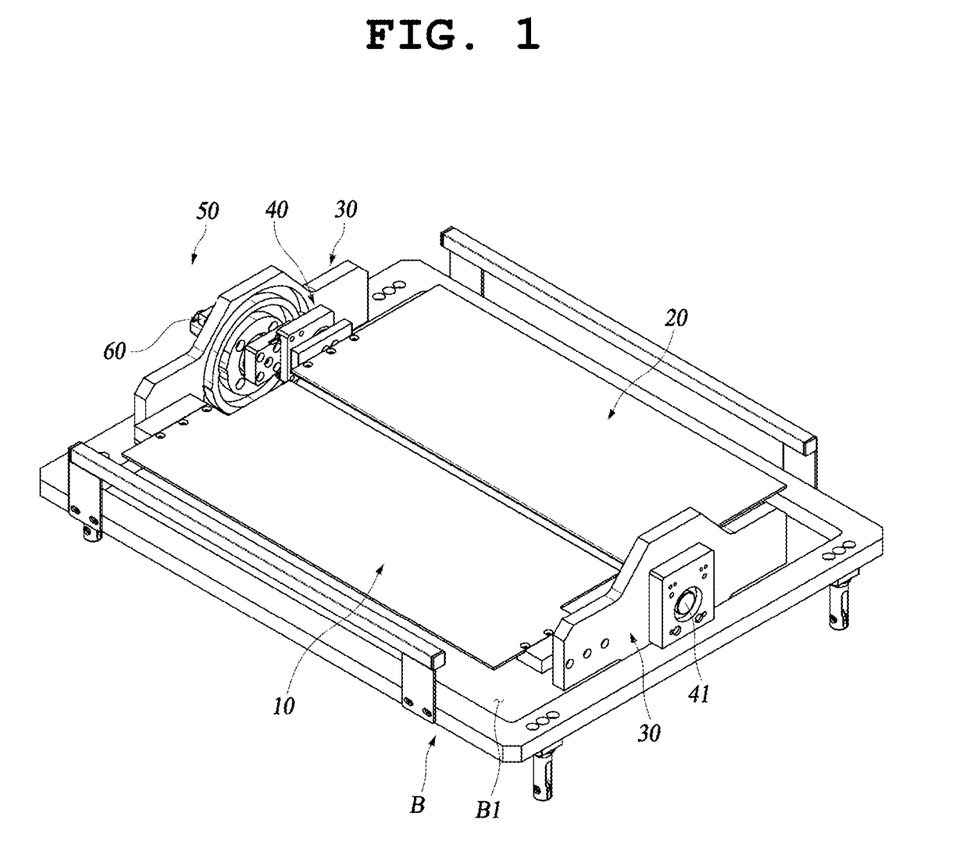
FIG. 1 is a perspective view illustrating a device for evaluating 360-degree bidirectional folding durability of a flexible material according to an embodiment of the present disclosure.
Figure 2:
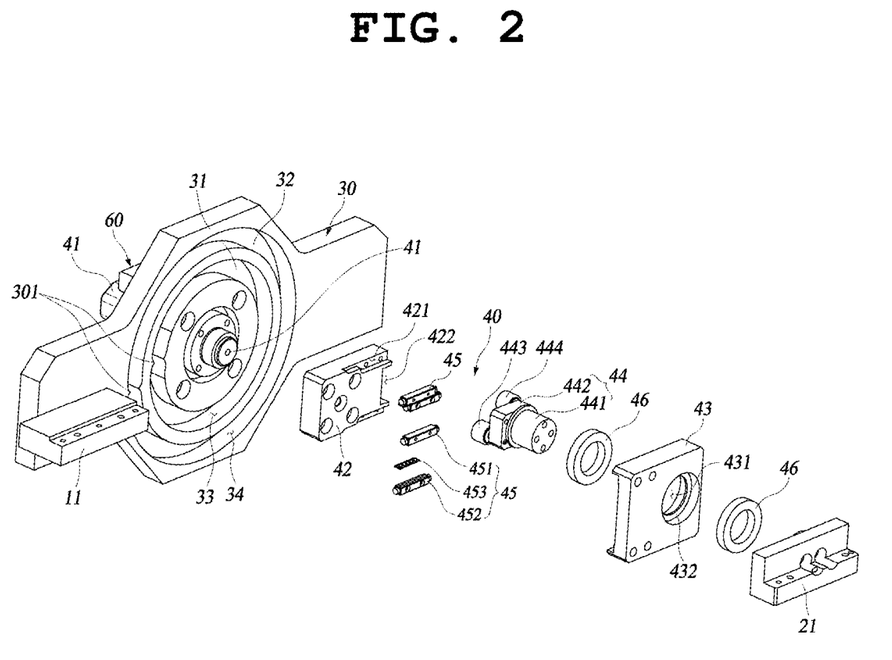
FIG. 2 is an exploded perspective view illustrating the detailed configuration of a motion unit of the device for evaluating 360-degree bidirectional folding durability of a flexible material according to the embodiment of the present disclosure.
Figure 3:
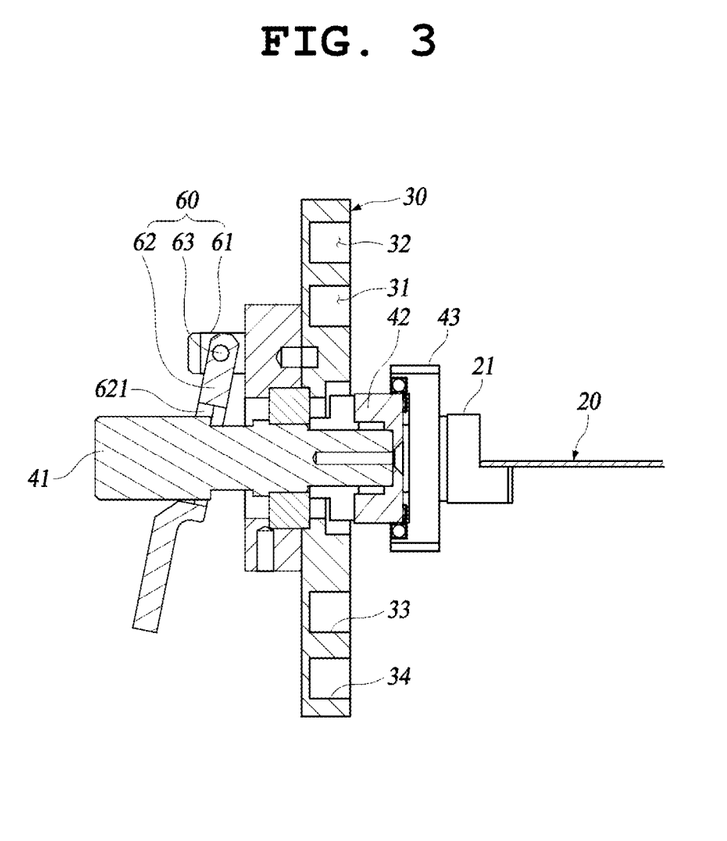
FIG. 3 is a front sectional view illustrating the device for evaluating 360-degree bidirectional folding durability of a flexible material according to the embodiment of the present disclosure.
Figure 4:
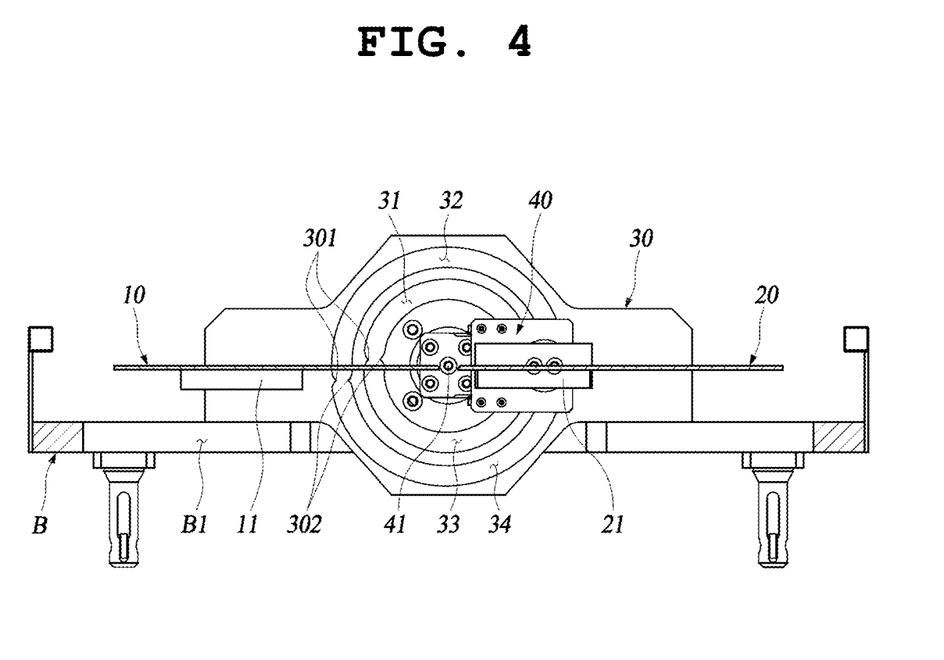
FIG. 4 is a side sectional view illustrating the device for evaluating 360-degree bidirectional folding durability of a flexible material according to the embodiment of the present disclosure.
Figure 5:
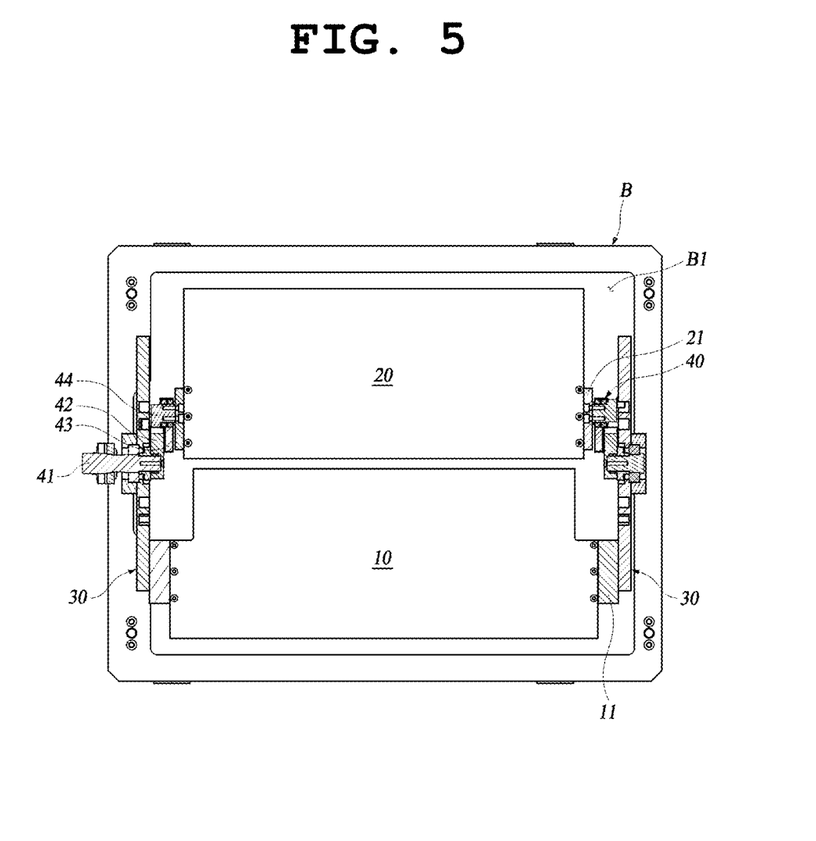
FIG. 5 is a plan sectional view illustrating the device for evaluating 360-degree bidirectional folding durability of a flexible material according to the embodiment of the present disclosure.

The motion unit 40 may include: a rotating shaft 41 located at the middle point and provided rotatably at the motion guide unit 30; a motion block 42 fixed to the rotating shaft 41 and protruding in a direction of a virtual straight line passing through the middle point; a sliding block 43 coupled to the motion block 42 such that the sliding block 43 slides along a longitudinal direction of the motion block 42; and a guide block 44 coupled rotatably to the sliding block 43 and having the guide protrusion part formed at the guide block by protruding therefrom, the guide protrusion part being fitted and coupled to the guide groove part such that the guide protrusion part moves along the guide groove part in response to the rotation of the moving unit 20. In this case, the moving unit 20 is fixed to the guide block 44 via the moving bracket 21.

In this case, when the moving unit 20 rotates, the sliding block 43 slides relative to the motion block 42, and when the guide block 44 rotates relative to the sliding block 43, the guide protrusion part stably moves while being inserted in the guide groove part, and in the infolding completion state of the flexible material F and the outfolded state of the flexible material F, the fixing unit 10 and the moving unit 20 can be substantially parallel to each other.

A guide seating part 421 may be formed at the motion block 42 by being recessed therefrom such that a connecting guide 45 is coupled to the guide seating part 421.

A block seating part 422 may be formed at the motion block 42 by being recessed therefrom such that a fixing body 442 of the guide block 44 is inserted removably to the block seating part 422 in response to the sliding of the sliding block 43.

The sliding block 43 has a pivot hole 431 formed therethrough such that the guide block 44 is rotatably inserted in the pivot hole 431 so as to facilitate the coupling of the guide block 44 and the moving unit 20 to each other. A block support bush 432 may be provided on the inner wall of the pivot hole 431, the block support bush being configured to support a rotating body 441 of the guide block 44 such that the rotating body can rotate.

The guide block 44 is coupled rotatably to the sliding block 43 and may include: the rotating body 441 to which the moving unit 20 is fixed via the moving bracket 21, and the fixing body 442 provided at the rotating body 441 and having the guide protrusion part formed by protruding from the fixing body.

Here, as for the guide protrusion part, two guide protrusion parts are spaced apart from each other by corresponding to the guide groove part having the double structure and are formed by protruding from the fixing body 442.

More specifically, the guide protrusion part includes the first protrusion part 443 moving in the first infolding groove 31 and the first outfolding groove 33, and the second protrusion part 444 being spaced apart from the first protrusion part 443 and moving in the second infolding groove 32 and the second outfolding groove 34. In this case, any one of the first protrusion part 443 and the second protrusion part 444 is included in any one of virtual straight lines passing through the middle point, and a remaining one of the first protrusion part 443 and the second protrusion part 444 is included in a remaining one of the virtual straight lines passing through the middle point. In the embodiment of the present disclosure, when the first protrusion part 443 is included in any one of the virtual straight lines passing through the middle point, the second protrusion part 444 is disposed in front of the virtual straight line in which the first protrusion part 443 is included, relative to a direction of the infolding.

The motion unit 40 may further include at least any one of the connecting guide 45 connecting the motion block 42 with the sliding block 43, and a support bearing 46 supporting the guide block 44 such that the guide block 44 rotates relative to the sliding block 43.

The connecting guide 45 may include: a motion support part 451 coupled to the guide seating part 421 of the motion block 42; a guide support part 452 coupled to the sliding block 43 such that the guide support part 452 faces the motion support part 451; and a slider 453 fitted and coupled slidably to a position between the motion support part 451 and the guide support part 452. In this case, the sliding of the sliding block 43 can be smoothly performed relative to the motion block 42.

The support bearing 46 may be inserted into the pivot hole 431 of the sliding block 43. The support bearing 46 may be provided at each of the opposite sides of the block support bush 432.

The motion drive unit 50 rotates the motion unit 40 relative to the motion guide unit 30. The motion drive unit 50 can rotate the rotating shaft 41 of the motion unit 40 clockwise/counterclockwise by power applied to the motion drive unit.

The rotation limiting unit 60 located at the middle point selects whether to rotate the moving unit 20 relative to the motion guide unit 30. The rotation limiting unit 60 includes a limiting bracket 61 provided at the motion guide unit 30, and a limiting lever 62 coupled to the limiting bracket 61 via a limiting shaft 63 such that the limiting lever 62 can make a pivot rotation. The limiting lever 62 has a shaft through hole part 621 formed therethrough such that the rotating shaft 41 passes through the shaft through hole part 621.

In this case, in an idle state, the rotating shaft 41 freely rotates in the shaft through hole part 621. In addition, when the pivot rotation of the limiting lever 62 is performed, a holding surface formed on the rotating shaft 41 is in close contact with and supported by the inner wall of the shaft through hole part 621, so the rotation of the rotating shaft 41 may be limited.

Reference numeral B is a base unit to which the motion guide unit is fixed. The fixing unit 10 sits on the base unit B, and a folding space B1 in which the moving unit 20 can rotate is defined in the base unit B. Reference numeral Pin is an infolding path indicating the movement path of the moving unit 20 according to the infolding of the flexible material F, and reference numeral Pout is an outfolding path indicating the movement path of the moving unit 20 according to the outfolding of the flexible material F.

Figure 7:
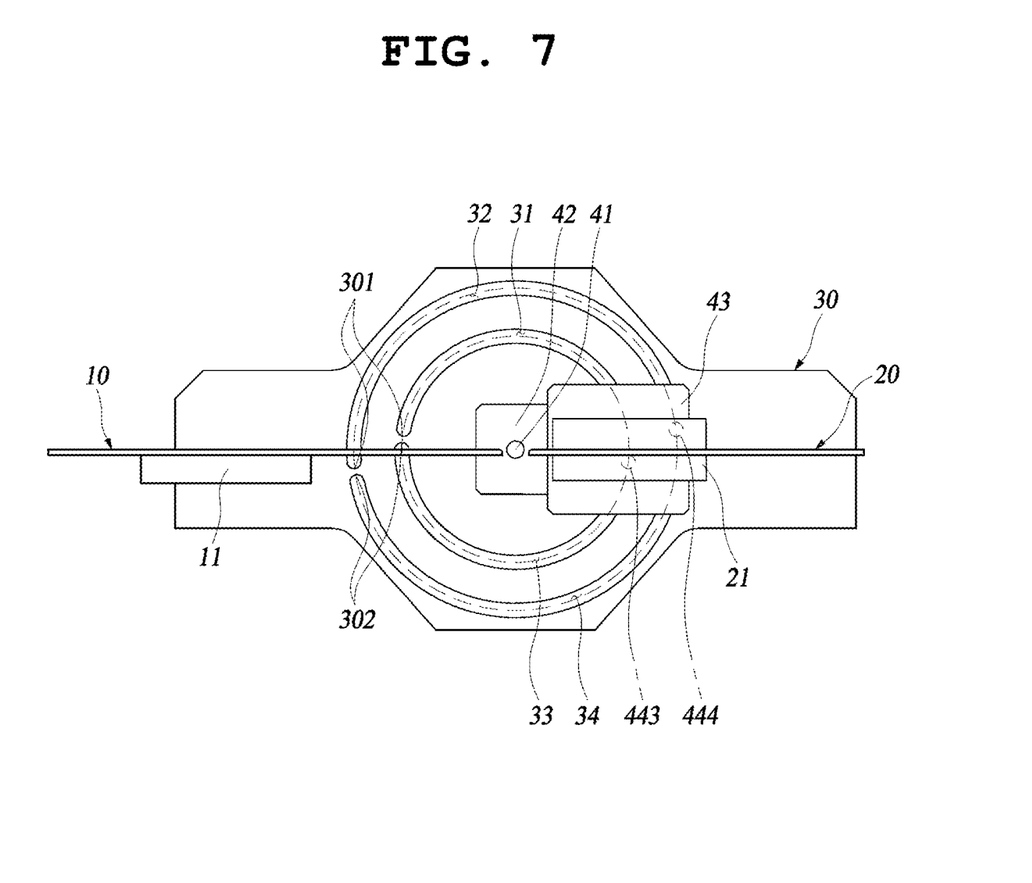
FIG. 7 is a view illustrating an unfolded state of the device for evaluating 360-degree bidirectional folding durability of a flexible material according to the embodiment of the present disclosure.

As illustrated in FIG. 7, in the unfolded state of the flexible material F, the fixing unit 10 and the moving unit 20 are disposed on the same plane.

When performing the infolding of the flexible material relative to the unfolded state thereof, the rotating shaft 41 is rotated counterclockwise, and the motion unit 40 and the moving unit 20 are rotated counterclockwise relative to the rotating shaft 41. In this case, according to the coupling relationship of the guide protrusion part and the guide groove part to each other, the unnecessary movement of the moving unit 20 can be prevented. Furthermore, according to the coupling relationship of the guide protrusion part and the guide groove part to each other, the sliding block 43 slides relative to the motion block 42, and the guide block 44 rotates relative to the sliding block 43, so forces including a tensile force are prevented from being applied to the flexible material F.

In addition, when the guide protrusion part is supported by the infolding stopper 301, the infolding is completed.

Figure 8:
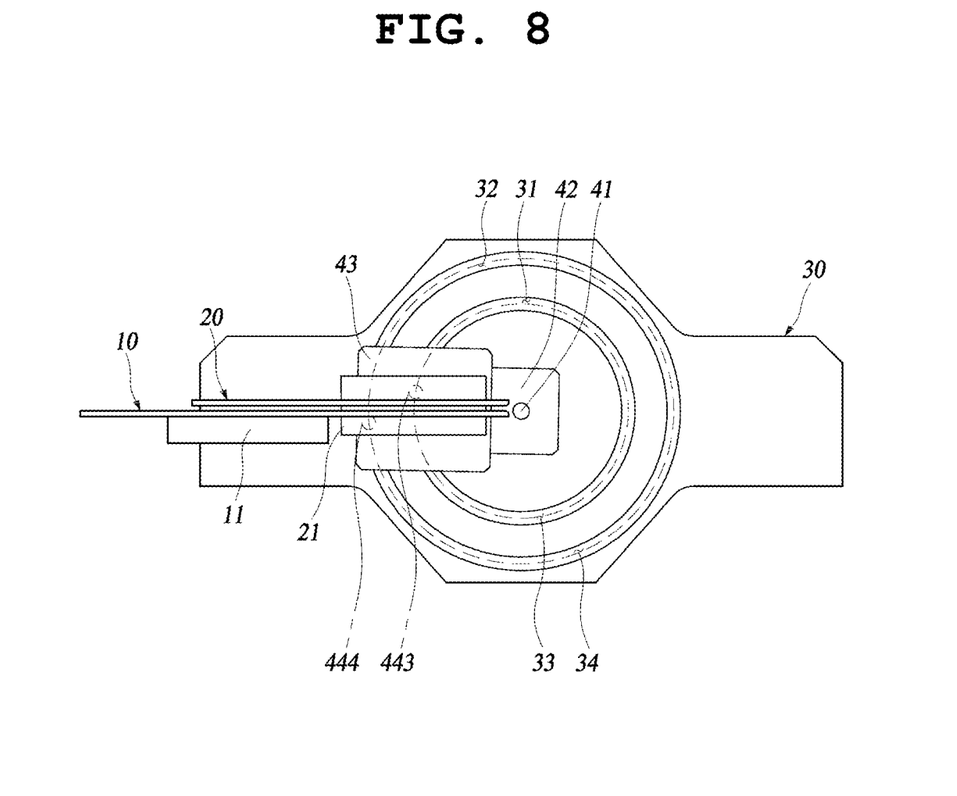
FIG. 8 is a view illustrating an infolding completion state of the device for evaluating 360-degree bidirectional folding durability of a flexible material according to the embodiment of the present disclosure.

As illustrated in FIG. 8, in the infolding completion state, the fixing unit 10 and the moving unit 20 are parallel to each other while being spaced apart by 2R0 from each other. In this case, the motion block 42 is disposed on the same virtual straight line as the sliding block 43, but as the guide block 44 rotates relative to the sliding block 43, the sliding block 43 and the moving unit 20 intersect with each other.

In addition, when the rotating shaft 41 is rotated clockwise in the infolding completion state of the flexible material, the flexible material may be restored to the unfolded state.

When performing the outfolding relative to the unfolded state, the rotating shaft 41 is rotated clockwise and the motion unit 40 and the moving unit 20 are rotated clockwise relative to the rotating shaft 41. In this case, according to the coupling relationship of the guide protrusion part and the guide groove part to each other, the unnecessary movement of the moving unit 20 can be prevented. Furthermore, according to the coupling relationship of the guide protrusion part and the guide groove part to each other, the sliding block 43 slides relative to the motion block 42, and the guide block 44 is rotated relative to the sliding block 43, so forces including a tensile force are prevented from being applied to the flexible material F.

Additionally, when the guide protrusion part is supported by the outfolding stopper 302, the outfolding is completed.

Figure 9:
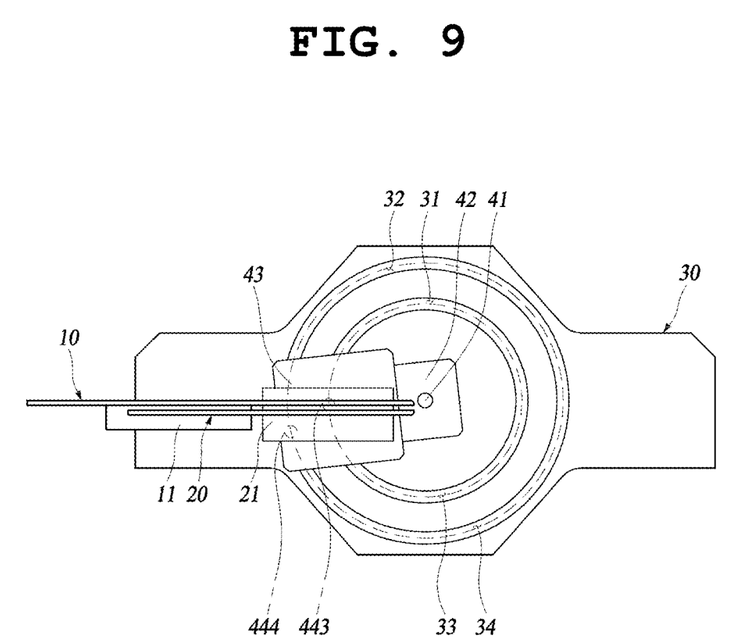
FIG. 9 is a view illustrating an outfolding completion state of the device for evaluating 360-degree bidirectional folding durability of a flexible material according to the embodiment of the present disclosure.

As illustrated in FIG. 9, in the outfolding completion state, the fixing unit 10 and the moving unit 20 are parallel to each other while being spaced apart by 2R1 from each other. In this case, the motion block 42 is disposed on the same virtual straight line as the sliding block 43, but as the guide block 44 rotates relative to the sliding block 43, the sliding block 43 and the moving unit 20 intersect with each other.

Furthermore, when the rotating shaft 41 is rotated counterclockwise in the outfolding completion state of the flexible material, the flexible material is restored to the unfolded state.

According to the device for evaluating 360-degree bidirectional folding durability of a flexible material described above, during the folding test of the film-type flexible material F, the single folding device can implement both the infolding and outfolding of the flexible material F relative to the unfolded state. In other words, during the folding test of the film-type flexible material F, the single folding device repeatedly folds the flexible material F by 180 degrees toward a side of each of the opposite surfaces of the flexible material F relative to the flexible material F, whereby the flexible material F can be repeatedly folded in opposite directions such that the curvature radius of the infolded bent part F1 according to the infolding of the flexible material and the curvature radius of the outfolded bent part F2 according to the outfolding of the flexible material are different from each other.

In addition, due to the coupling relationship of the motion guide unit 30 and the motion unit 40 to each other, the unnecessary movement of the moving unit 20 can be prevented in the process of the rotation of the moving unit 20.

Furthermore, due to the detailed configuration of the motion unit 40, the rotation of the moving unit 20 is efficiently performed, and when the infolding and outfolding of the flexible material F are performed during the folding test of the flexible material F, forces including a tensile force are not applied to the flexible material F, thereby securing the high reliability of the test and enabling a corresponding accurate durability evaluation.

Additionally, when performing the infolding and outfolding of the flexible material during the folding test of the flexible material, due to the configurations of stoppers 301 and 302, the guide protrusion part can be stopped in the guide groove part, and the folding completion state of the flexible material F can be secured.

In addition, due to the detailed configuration of the guide groove part, the rotation path of the moving unit 20 is defined, thereby stabilizing the parallel state of the fixing unit 10 and the moving unit 20 to each other in the folding completion position.

Furthermore, according to the present disclosure, due to the detailed configuration of the guide protrusion part, the movement of the motion unit 40 can be stabilized during the rotation of the moving unit 20.

Additionally, due to the configuration of the motion drive unit 50, the folding test can be automated.

In addition, due to the configuration of the rotation limiting unit 60, whether to rotate the moving unit 20 can be selected.

Furthermore, due to numerical limitation of each element of the single folding device, the infolding and outfolding of the single folding device can be prevented from interfering with each other and the flexible material can be safely protected.

Although the exemplary embodiment of the device of the present disclosure has been described with reference to the drawings as described above, those skilled in the art can variously modify or change the device of the present disclosure without departing from the spirit and scope of the present disclosure as set forth in the following claims.

INDUSTRIAL APPLICABILITY

According to the present disclosure, during a folding test of a film-type flexible material, the single folding device can implement both the infolding and outfolding of the flexible material relative to the unfolded state of the flexible material.

What is claimed is:

1. A device for evaluating 360-degree bidirectional folding durability of a flexible material, the device comprising:
   a fixing unit configured to fix a first side of the flexible material to be evaluated;
   a moving unit configured to fix a second side of the flexible material and disposed to be spaced apart from the fixing unit such that the moving unit has the same plane as a plane of the fixing unit in an unfolded state of the flexible material, the moving unit being configured to rotate relative to the fixing unit so as to infold or outfold the flexible material in the unfolded state;
   a motion guide unit to which the fixing unit is fixed, the motion guide unit forming a rotation path of the moving unit such that the moving unit rotates relative to a middle point between the fixing unit and the moving unit; and
   a motion unit connecting the motion guide unit with the moving unit,
   wherein the moving unit makes a pivot rotation relative to the motion unit in response to each of the infolding and outfolding of the flexible material, and slides along a normal direction passing through the middle point between the fixing unit and the moving unit,
   wherein a circular guide groove part is formed in the motion guide unit by being recessed therefrom by corresponding to the rotation path of the moving unit,
   wherein the motion unit comprises:
      a rotating shaft located at the middle point and provided rotatably at the motion guide unit;
      a motion block fixed to the rotating shaft;
      a sliding block coupled to the motion block such that the sliding block slides along a longitudinal direction of the motion block; and
      a guide block coupled rotatably to the sliding block and having a guide protrusion part formed at the guide block by protruding therefrom, the guide protrusion part being fitted and coupled to the guide groove part such that the guide protrusion part moves along the guide groove part in response to the rotation of the moving unit, and wherein the moving unit is fixed to the guide block.

2. The device of claim 1, wherein the guide groove part is provided with an infolding stopper indicating an infolding completion position of the flexible material, and an outfolding stopper indicating an outfolding completion position of the flexible material.

3. The device of claim 2, further comprising:
at least any one of a motion drive unit configured to rotate the motion unit relative to the motion guide unit, and a rotation limiting unit located at the middle point and configured to select whether to rotate the moving unit relative to the motion guide unit.

4. The device of claim 2, wherein when a curvature radius of an infolded bent part formed on the flexible material in an infolded state thereof is R0, and when a curvature radius of an outfolded bent part formed on the flexible material in an outfolded state thereof is R1, R1 indicates a curvature radius larger than R0, and a distance between the fixing unit and the moving unit is expressed as $\pi R1$.

5. The device of claim 1, wherein the guide groove part comprises:
an arc-shaped first infolding groove constituting a movement path of the guide protrusion part according to the infolding among movement paths of the moving unit;
an arc-shaped second infolding groove formed at an outer side of the first infolding groove to be parallel thereto and constituting a movement path of the guide protrusion part according to the infolding among the movement paths of the moving unit;
an arc-shaped first outfolding groove communicating with the first infolding groove and constituting a movement path of the guide protrusion part according to the outfolding among the movement paths of the moving unit; and
an arc-shaped second outfolding groove communicating with the second infolding groove and formed at an outer side of the first outfolding groove to be parallel thereto, the second outfolding groove constituting a movement path of the guide protrusion part according to the outfolding among the movement paths of the moving unit.

6. The device of claim 5, wherein the guide protrusion part comprises:
a first protrusion part moving in the first infolding groove and the first outfolding groove; and
a second protrusion part moving in the second infolding groove and the second outfolding groove,
wherein any one of the first protrusion part and the second protrusion part belongs to any one of virtual straight lines passing through the middle point, and
wherein a remaining one of the first protrusion part and the second protrusion part belongs to a remaining one of the virtual straight lines passing through the middle point.

7. The device of claim 6, further comprising:
at least any one of a motion drive unit configured to rotate the motion unit relative to the motion guide unit, and a rotation limiting unit located at the middle point and configured to select whether to rotate the moving unit relative to the motion guide unit.

8. The device of claim 6, wherein when a curvature radius of an infolded bent part formed on the flexible material in an infolded state thereof is R0, and when a curvature radius of an outfolded bent part formed on the flexible material in an outfolded state thereof is R1, R1 indicates a curvature radius larger than R0, and a distance between the fixing unit and the moving unit is expressed as $\pi R1$.

9. The device of claim 5, further comprising:
at least any one of a motion drive unit configured to rotate the motion unit relative to the motion guide unit, and a rotation limiting unit located at the middle point and configured to select whether to rotate the moving unit relative to the motion guide unit.

10. The device of claim 5, wherein when a curvature radius of an infolded bent part formed on the flexible material in an infolded state thereof is R0, and when a curvature radius of an outfolded bent part formed on the flexible material in an outfolded state thereof is R1, R1 indicates a curvature radius larger than R0, and a distance between the fixing unit and the moving unit is expressed as $\pi R1$.

11. The device of claim 1, further comprising:
at least any one of a motion drive unit configured to rotate the motion unit relative to the motion guide unit, and a rotation limiting unit located at the middle point and configured to select whether to rotate the moving unit relative to the motion guide unit.

12. The device of claim 1, further comprising:
at least any one of a motion drive unit configured to rotate the motion unit relative to the motion guide unit, and a rotation limiting unit located at the middle point and configured to select whether to rotate the moving unit relative to the motion guide unit.

13. The device of claim 1, wherein when a curvature radius of an infolded bent part formed on the flexible material in an infolded state thereof is R0, and when a curvature radius of an outfolded bent part formed on the flexible material in an outfolded state thereof is R1, R1 indicates a curvature radius larger than R0, and a distance between the fixing unit and the moving unit is expressed as $\pi R1$.

14. The device of claim 1, wherein when a curvature radius of an infolded bent part formed on the flexible material in an infolded state thereof is R0, and when a curvature radius of an outfolded bent part formed on the flexible material in an outfolded state thereof is R1, R1 indicates a curvature radius larger than R0, and a distance between the fixing unit and the moving unit is expressed as $\pi R1$.

* * * * *